July 22, 1969   S. E. MILLER   3,457,001
THERMAL ELECTROMAGNETIC WAVEGUIDE HAVING TRANSVERSE GAS FLOW
Filed Aug. 8, 1966                                           2 Sheets-Sheet 1
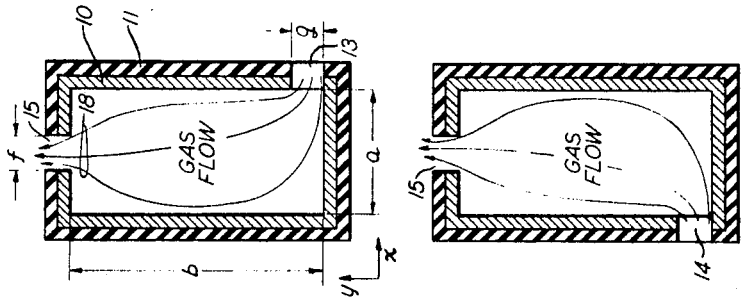
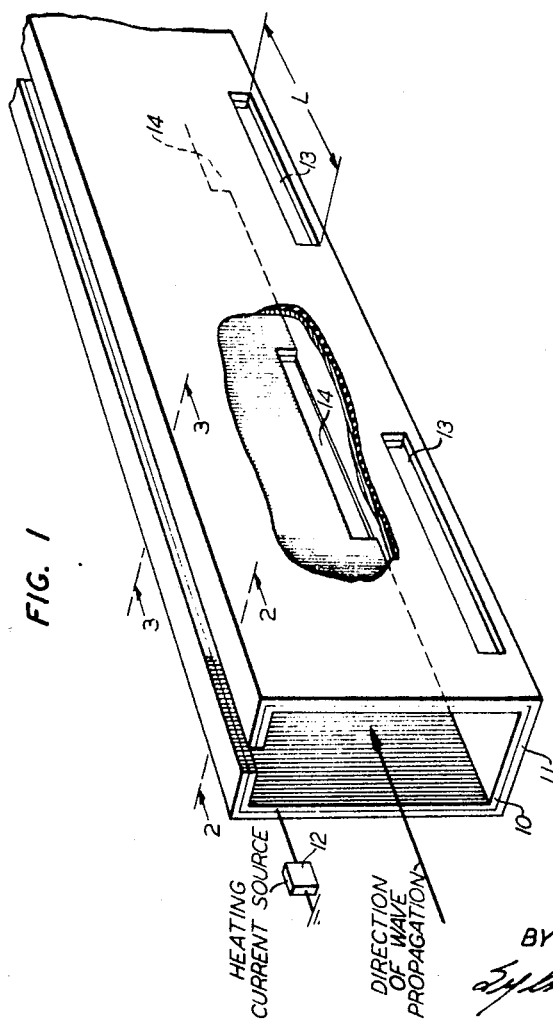
INVENTOR
S. E. MILLER
BY
Sylvan Sherman
ATTORNEY 3,457,001
THERMAL ELECTROMAGNETIC WAVEGUIDE
HAVING TRANSVERSE GAS FLOW
Stewart E. Miller, Middletown Township, Monmouth
County, N.J., assignor to Bell Telephone Laboratories,
Incorporated, Murray Hill, N.J., a corporation of New
York
Filed Aug. 8, 1966, Ser. No. 570,939
Int. Cl. G02b 5/14
U.S. Cl. 350—96                         3 Claims

ABSTRACT OF THE DISCLOSURE

This application describes a continuous gas waveguide in which the gas flow is transverse to the direction of wave propagation. The guide enclosure, which is heated, is supplied with gas input ports along two sides, and with gas output ports along a third side. By alternating the location of the input ports from one side of the guide to the other, the resulting temperature distribution is such as to produce the largest refractive index near the center of the enclosure. The device is thereby capable of serving as a waveguide. It is an advantage of the present invention that convection effects, which normally are a disruptive phenomenon, are utilized to establish the requisite temperature gradient across the waveguide.

---

This invention relates to thermal gaseous waveguides.

In an article by D. W. Berreman entitled, "A Lens or Light Guide Using Convectively Distorted Thermal Gradients in Gases," published in the July 1964 issue of the Bell System Technical Journal, pp. 1469–1475, there is described a thermal gaseous waveguide particularly adapted for the transmission of optical wave energy. It is a characteristic of the waveguide described by Berreman that a thermal gradient is established across the wavepath as a means of guiding the optical wave energy propagating therealong.

Recognizing that a gaseous waveguide is intended to transmit wave energy over long distances, it becomes apparent that in order for such a system to be commercially attractive, the waveguide advantageously is both inexpensive to fabricate and economical to operate. That is, the structure should be a relatively simple one, and the operating requirements, including the power needed to establish the requisite temperature gradient, the amount of gas used, and the associated equipment needed to maintain the gas flow through the system, should all be as small as possible.

In accordance with the present invention, these preferred characteristics are realized in a waveguiding system in which the gas flow is transverse to the direction of wave propagation. The guide enclosure, which is heated, is supplied with a plurality of gas input ports longitudinally distributed along opposite sides of the wavepath, and with gas output ports longitudinally distributed along a third side, between the input ports. By alternating the location of the input ports from one side of the guide to the other along the direction of propagation, the resulting effective temperature distribution within the enclosure is such as to guide the wave energy therealong.

It is an advantage of the present invention that convection effects, which normally are a descriptive phenomenon, can be utilized to establish the requisite temperature gradients across the waveguide. This materially simplifies the waveguiding structure as there is no longer a need to provide means for countering convection effects as in prior art structures. In addition, the power requirements of the system are reduced by eliminating the need for gas pumps. However, forced gas flow can be used in those situations where the guide must extend vertically.

These and other objects and advantages, the nature of the present invention, and its various features, will appear more fully upon consideration of the various illustrative embodiments now to be described in detail in connection with the accompanying drawings, in which:

FIG. 1 shows a first embodiment of the invention wherein the flow of gas through the waveguide is the result of convection effects;

FIGS. 2 and 3 are cross sections of the waveguide illustrated in FIG. 1 in which the input ports are on opposite sides;

Figure 5:
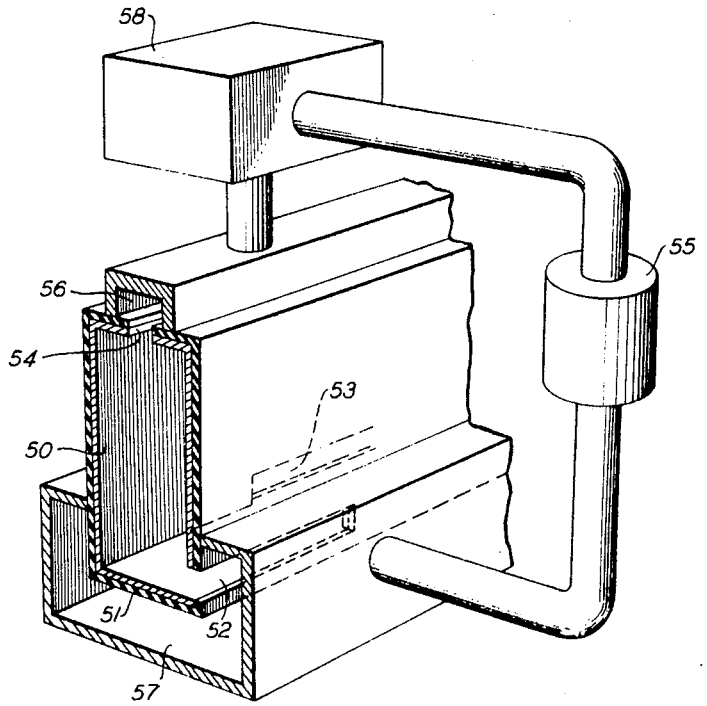
FIG. 5 is a second embodiment of the invention wherein the gas flow through the waveguide is forced.

Referring to the drawing, FIG. 1 shows a portion of a thermal gaseous waveguide comprising an inner chamber 10 surrounded by a thermal insulating jacket 11. Advantageously, chamber 10 is made of a heat conducting material, such as copper or aluminum, as it is the heat derived from the walls of the chamber which heats the gas flowing through chamber 10. Means for heating chamber 10 are provided in any convenient manner known in the art. For example, chamber 10 can be made electrically resistive and heated by causing a current to flow longitudinally along the chamber walls. Such an arrangement is illustrated in FIG. 1 which shows a heating current source 12 connected at one end of chamber 10. Alternatively, chamber 10 can be surrounded by a separate heating element (not shown).

The insulating jacket 11, surrounding chamber 10, is made of any suitable material, such as one of the presently available plastics (foamed polyurethane or polystyrene), and serves to conserve energy by insulating chamber 10 from its surroundings.

While shown as two separate members, for purposes of illustration and explanation, it is understood that chamber 10 and jacket 11 can just as readily be constructed as a single, unitary structure having a heated inner surface and an insulating outer surface.

The requisite thermal gradient within chamber 10 is established by introducing a gas at the bottom of chamber 10 and exhausting it at the top of the chamber. For this purpose, a plurality of gas input ports 13 and 14 are longitudinally distributed along opposite sides, respectively, of chamber 10, with the ports along one side being longitudinally displaced relative to the ports along the other side. Advantageously, the input ports are located along the bottom portion of chamber 10. A gas output port 15 is centrally located along the top of the chamber. While shown as a continuous opening, the output port 15 may be divided into a plurality of ports for mechanical reasons. However, insofar as it relates to the operation of the waveguide, port 15 can be considered as a single, longitudinally extending aperture.

It will be noted that the input ports are located along the sides of chamber 10, and that their location alternates from side to side along the direction of wave propagation. The reason for this can be best explained with reference to FIGS. 2, 3 and 4.

FIG. 2 is a cross section taken through the waveguide at one of the input ports 13. Gas entering port 13 is heated by the chamber walls and, as a result, tends to rise within chamber 10 and to leave by way of output port 15. The gas flow within the chamber is represented by the flow lines 18 and, as can be seen, the gas flows in a direction transverse to the long dimension of chamber 10.

Figure 4:
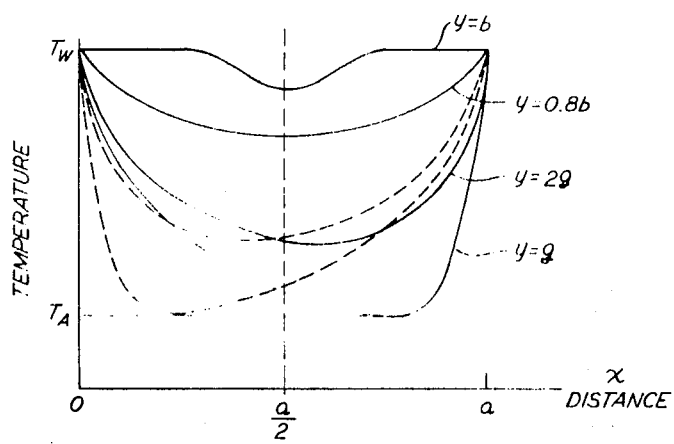
FIG. 4 shows the temperature distribution across the waveguide for the two sections illustrated in FIGS. 2 and 3.

FIG. 4 shows the gas temperature distribution at different locations within chamber 10 with reference to an $x$-$y$ coordinate system (represented by the $x$ and $y$ vectors) wherein the chamber dimensions along the $x$ and $y$ directions are given as $a$ and $b$, respectively, and wherein the dimension of input port 13 along the $y$ direction is $g$. With reference to FIG. 4, it is seen that for $y=b$, or immediately adjacent to the upper wall of chamber 10, the gas temperature is essentially equal to the wall temperature $T_W$, except at output aperture 15, where it is slightly less than the wall temperature. The gas temperature distribution at an intermediate location within chamber 10, typically represented by curve $y=0.8b$, is a maximum at the guide walls and reaches a minimum at about the center of the chamber. However, in the lower portions of chamber 10, the gas temperature distribution is distorted in the direction towards the input aperture, as represented by the two curves $y=2g$ and $y=g$. The lowest gas temperature is, of course, the temperature $T_A$ of the gas entering chamber 10, and is the temperature of the gas immediately adjacent to the input port.

It is apparent that if the temperature distribution represented by the solid curves shown in FIG. 4 extended throughout the length of the waveguide, an optical beam directed into chamber 10 would be deflected towards the input port since that is the region of lowest temperature and, hence, the region of the highest refractive index. Accordingly, means must be provided for countering this tendency. In accordance with the invention, the direction of propagation is maintained in the desired direction by changing the location of the input port to the opposite side of chamber 10, as illustrated in the waveguide section taken through one of the number 14 input ports shown in FIG. 3.

In all respects FIG. 3 is thes mirror image of FIG. 2 and the temperature distribution curves, shown dotted in FIG. 4, are the mirror images of those for FIG. 2, shown in solid line in FIG. 4.

As can be seen from the temperature distribution curves, by alternating the locations of the input ports along the direction of propagation from side to side, as illustrated in FIG. 1, any tendency for the beam to be deflected in one direction in any region of the waveguide is compensated for by a subsequent tendency to be deflected in the opposite direction a short distance further along the waveguide. Thus, the net effect is that the beam is guided along a longitudinal axis well within chamber 10 with, at most slight oscillations back and forth about said axis.

Representative dimensions and temperatures for an optical waveguide in accordance with the invention are $b=0.420''$, $a=0.170''$, $g=0.150''$, $L=5.5''$ and $f=0.200''$. For an ambient temperature of $T_A=70°$ F., a wall temperature $T_W$ between 150° F. and 180° F. is typical.

The operation of the waveguide illustrated in FIG. 1 depends upon the establishment of convection currents due to the heating of the gas entering chamber 10. It is apparent that such a system will not operate in the manner described if the waveguide extends in a vertical direction. Therefore, some other means, which does not rely upon convection effects, must be provided for forcing the gas to flow transversly across the waveguide. One arrangement for doing this is illustrated in FIG. 5. Basically, the waveguide is as described above, comprising an inner heated portion 50 surrounded by an outer insulating jacket 51. A plurality of input ports 52 and 53 are longitudinally distributed along opposites of the enclosure, and an output port 54 is provided along a third side. It will be noted that since the waveguide extends vertically, the concept of upper and lower, with regards to the location of the gas ports, no longer applies.

The arrangement of FIG. 5 differs from that of FIG. 1 in that means, in the form of a pump 55, are now provided for forcing the gas to flow in the desired direction. Associated with the pump are an exhaust gas chamber 56, located adjacent to the gas output port 54, for collecting the exhaust gas, and an input gas chamber 57, located immediately adjacent to the input gas ports 52 and 53, for receiving the gas from pump 55 and directing it to the input ports 52 and 53. In this manner, a continuous, forced gas flow is established. Also included in FIG. 5 are means 58 for cooling the exhaust gas. Not shown, however, are baffles and the like for maintaining a uniform gas flow along the waveguide. It is also understood that while only one pump is shown, additional pumps and gas coolers would be provided, as required, depending upon the length of the vertical section of waveguide.

In FIGS. 1 and 5, a rectangularly shaped waveguide is illustrated. This, it is understood, is merely by way of example. It is apparent that chamber 10 may alternatively have a circular, an oval or triangular cross section and operate in the manner explained equally as well. All that is required is that the gas input ports be located on alternate sides of the chamber along the direction of propagation, and that the exhaust port be located between the input ports cn an opposite side of the waveguide.

Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A thermal gaseous waveguide for guiding electromagnetic wave energy comprising:
   an elongated hollow enclosure within which said wave energy propagates;
   means for producing a flow of gas across said enclosure in a direction transverse to the direction of wave propagation including:
      a plurality of spaced gas input ports longitudinally distributed along each of two opposite sides of said enclosure, with the ports along one side being longitudinally displaced relative to the ports along the other of said sides;
      and gas output ports for exhausting said gas from within said enclosure extending longitudinally therealong;
   and means for heating said enclosure, thereby producing a temperature gradient across said gas in a direction transverse to the direction of wave propagation.

2. The waveguide according to claim 1 wherein said gas flow is the result of convection effects.

3. The waveguide according to claim 1 wherein said gas flow is forced.

References Cited

UNITED STATES PATENTS 3,390,934    7/1968    Berreman _____ 350—179

JOHN K. CORBIN, Primary Examiner

U.S. Cl. X.R.

350—161, 179